(12) United States Patent
Ikuta et al.

(10) Patent No.: US 6,730,764 B1
(45) Date of Patent: May 4, 2004

(54) CONCRETE HARDENING RETARDER

(75) Inventors: Toru Ikuta, Kobe (JP); Mitsuteru Mutsuda, Himeji (JP)

(73) Assignee: Daicel Huels Ltd., Tokyo (JP)

( * ) Notice: Subject to any disclaimer, the term of this patent is extended or adjusted under 35 U.S.C. 154(b) by 0 days.

(21) Appl. No.: 09/402,537

(22) PCT Filed: Feb. 5, 1999

(86) PCT No.: PCT/JP99/00516

§ 371 (c)(1),
(2), (4) Date: Dec. 15, 1999

(87) PCT Pub. No.: WO99/40041

PCT Pub. Date: Aug. 12, 1999

(30) Foreign Application Priority Data

Feb. 6, 1998 (JP) ............................................. 10/25296

(51) Int. Cl.⁷ ............................................. C08F 118/02
(52) U.S. Cl. ..................... 526/319; 526/320; 525/327.8; 525/328.9; 525/330.2; 525/367; 525/369; 428/343; 428/480; 528/302; 528/308.7; 264/299
(58) Field of Search ........................... 525/327.8, 328.9, 525/330.2, 367, 369; 526/319, 320; 428/343, 480; 528/302, 308.7; 264/299

(56) References Cited

U.S. PATENT DOCUMENTS 6,077,910 A  *  6/2000  Ikuta et al. ............... 525/327.8
6,114,033 A  *  9/2000  Ikemoto et al. ............. 428/343

FOREIGN PATENT DOCUMENTS

| EP | 0754 656 A1 | * | 8/1996 | ........... C04B/24/04 |
| JP | A48-29821 | | 4/1973 | |
| JP | A59-162161 | | 9/1984 | |
| JP | A8-118325 | | 5/1996 | |
| JP | B2-2601368 | | 1/1997 | |
| JP | A9-183643 | | 7/1997 | |
| WO | WO 96/24563 | * | 8/1996 | ........... C04B/24/04 |

* cited by examiner

Primary Examiner—Tatyana Zalukaeva
(74) Attorney, Agent, or Firm—Birch, Stewart, Kolasch & Birch, LLP

(57) ABSTRACT

A concrete retarder comprises a polymer (A) having the concrete set retarding ability. The polymer (A) has, as a structural unit, a low glass transition temperature (Tg) component with a Tg of not higher than −5° C., and a surface tension of 45 mN/m or lower. The proportion of the low Tg component having a glass transition temperature (Tg) of not higher than −5° C. is 10% by weight or more relative to the whole polymer (A). The polymer (A) has a functional group which can form a salt with a metal ion (particularly, a free acid group or a group capable of forming an acid group by hydrolysis). The polymer (A) is a vinyl-series polymer, a polyester (saturated or unsaturated polyester), or a crosslinked or graft polymerized unsaturated polyester. A sheet and a decorative pack may be formed with the concrete retarder.

24 Claims, No Drawings

CONCRETE HARDENING RETARDER

This application is the national phase under 35 U.S.C. §371 of PCT International Application No. PCT/JP99/00516 which has an International filing date of Feb. 5, 1999, which designated the United States of America.

TECHNICAL FIELD

The present invention relates to concrete surface retarders and more particularly to concrete surface retarders used in the fields of tapes, sheets and films when previously applying tiles to precast concrete panels (PC panels), whereby smears on the surfaces of tiles can be removed with ease or the surface of aggregate is easily washed up and made exposed by directly applying the retarder on the surface of concrete.

BACKGROUND ART

The external walls of constructions such as buildings are in many cases decorated with tiles to make the external appearance thereof better and more beautiful. However, applying tiles on site to the concrete wall surface already made requires many workers and takes long time. Moreover, the adhesive strength of tiles to concrete is not always sufficient and some fixed tiles may be separated from and fall off the concrete wall surface.

For such reasons, the tile preapplied panel method has been employed, in which panels for concrete with tiles thereon are fabricated in factories beforehand and assembled on site. In this tile preapplied panel method, generally, the required number of tiles are arranged like a matrix and adhered to a tacky adhesive sheet to give a tile pack, and the obtained tile pack is placed on the inner surface of a form. Thereafter, with reinforcemnts arranged inside the form if necessary, concrete is poured into the form and left for a set. Then, after the set of the concrete, the form is disassembled to give a precast concrete (PC) panel.

By the way, in the tile preapplied panel method using tile packs, when a pack simply consisting of a tacky adhesive sheet and tiles adhered thereto is used, concrete which will later be fed to a form completely fills up the gaps (joints) between the tiles and therefore no joint section can be formed. Accordingly, tile packs of which the joints between the tiles are stuffed with tapes cut from a sheet of, e.g., urethane foam or polyethylene foam, or with a net-like shaped article punched out so as to fit the joints are usually employed. However, in such method, treatment of joints is laborious, leading to low productivity.

Moreover, in the tile preapplied panel method, inescapably, part of concrete leaks through joints and reach the surfaces of tiles. So, after the set of the concrete followed by the removal of the form, the cured or set concrete composition (mortar component) leaked onto the tile surfaces must be scraped off. It has been conventional that the cured or hardened concrete sticking to the tile surfaces is manually scraped off with a tool such as a scraper, a cutter knife. However, besides the cured concrete being so hard, the tile surfaces must be prevented from being damaged, making the scraping step troublesome and time- and effort-consuming. In addition to this, a fear of damaging the tile surface makes mechanically removing the set or cured concrete more difficult. As can be understood from the above, in the production of conventional tile packs, treatment of joints is complicated and troublesome and finishing the tile surface is difficult.

To make the tile surface treatment more easier and simpler, e.g., Japanese Patent Application Laid-Open No. 29821/1973 (JP-A-48-29821) and Japanese Patent Application Laid-Open No. 118325/1996 (JP-A-8-118325) propose a method for easily removing smears of concrete using a cement set retarder which is an additive to concrete.

Japanese Patent Application Laid-Open No. 29821/1973 (JP-A-48-29821) discloses a method in which the outer surfaces of a plurality of tiles are adhered to a tile sheet made of paper using a bonding agent blended with a cement set retarder. In this method, however, a large amount of water contained in the concrete composition is absorbed into the tile sheet paper, and the absorbed water tends to render the sheet wrinkled or swollen. As a result, the retarder cannot act sufficiently at the gap formed between the tile surfaces and the tile sheet and cannot give sufficient effects. Moreover, the bonding agent prevents the retarder from coming into contact with concrete and therefore the retarder cannot fully exhibit its effects.

Moreover, Japanese Patent Application Laid-Open No. 118325/1996 (JP-A-8-118325) discloses a method in which a sheet of which the adhesive layer contains a cement set retarder is used. In this method, however, there is a crucial problem that the adhesive layer often prevents the set retarder from coming into contact with concrete and consequently the retarder incorporated to the layer cannot fully exhibit its effects. Further, according to this method, the mortar component remaining on the tile surfaces can be removed with ease but to a limited extent, and efficient treatment of the joints between the tiles cannot be expected.

Japanese Patent Application Laid-Open No. 183643/1997 (JP-A-9-183643) discloses a cement retarder comprising a polyester obtained by the reaction of a polycarboxylic acid component having 2 to 6 carbon atoms in the main chain with a polyol component containing a polyhydric alcohol or condensate thereof having 2 to 4 carbon atoms, wherein the weight average molecular weight of the polyester is 300 to 100,000. The above cement retarder is poor in adhesion properties and needs to be used together with an adhesive, bonding agent, etc. However, the addition of an adhesive (bonding agent) in such an amount as to give sufficient adhesion causes a deterioration in cement set retardancy and therefore it is difficult to hold both curing or setting retardancy and adhesion properties compatibly.

As can be understood from the above, in the conventional concrete retarders, an adhesive component and a cement set retardative component are different from each other and such different components are simply mixed or blended. Considering the fact that the adhesive component does not have the effect of retarding the set of concrete and that the retardative component does not have the adhering effect, the idea of giving a single surface two different functions, i.e., the functions of adhering the tile surface to concrete and retarding the set of concrete, is itself contradictory and has a lot of problems. In fact, as was described above, since the effects of the retarders are hindered by the adhesive component or adhesive layer, development of new techniques has been desired.

Thus, it is an object of the present invention to provide a concrete retarder having both adhesion or adhesion properties and retardancy compatibly, and a concrete set retardative sheet using the same.

It is further object of the present invention to provide a concrete retarder which has adhesion and retardancy both at high levels and is capable of forming joint sections with good precision, and a concrete retardative sheet using the same.

It is yet another object of the present invention to provide a tile pack using the above sheet, and a process for producing a decorative concrete product using the tile pack.

It is yet another object of the present invention to provide a process for conveniently producing a decorative concrete product.

DISCLOSURE OF INVENTION

The present invention is done for achieving the above objects and characterized in that a retarder itself has adhesion or adhesion properties.

To summarize, the concrete retarder of the present invention is a concrete retarder comprising, as a main component, a polymer (A) having the ability of retarding the curing or set of concrete upon contact with unset concrete, and the polymer (A) has a low glass transition temperature (Tg) component having a Tg of not higher than −5° C. and a surface tension of not higher than 45 mN/m as a structural unit. The content of the low Tg component having a glass transition temperature (Tg) of not higher than −5° C. is about 10% by weight or more relative to the whole polymer (A). The polymer (A) may have a functional group which is able to form a salt with a metal ion (particularly, a free acid group, or a group capable of forming an acid group by hydrolysis). The polymer (A) may have a hydrophilic group (particularly, hydroxyl group) other than acid groups. The above polymer (A) may have the low Tg component with a Tg of not higher than −5° C. at least either in the main chain or the side chain. The polymer (A) is a vinyl-series polymer, a polyester (saturated or unsaturated polyester), or a crosslinked or graft polymerized unsaturated polyester. The crosslinked unsaturated polyester (graft polymer) may be constituted of an unsaturated polyester and a vinyl compound. In this case, the number of unsaturated bonds of the unsaturated polyester on average may be eight or less per molecule.

The present invention further includes a concrete retardative sheet made with the above concrete retarder, a decorative pack comprising the above sheet and a decorative material (member, pieces, stuff) provided on the surface of the sheet, and a process for producing decorative or ornamental concrete products using the pack.

In the specification, hardened or set cement-like compositions (e.g., mortar) are all referred to as "concrete".

Moreover, in the specification, retarding or delaying the set of cement or cement-like compositions is generally expressed by the phrase "retardation of the set of concrete".

Further, the phrase "having the concrete set retarding ability" used in the specification means that the agent has the ability of retarding the set of concrete. Particularly, when the depth of concrete set-retarded measured according to the method described in EXAMPLES which will later be described [evaluation method (2)-1] is 0.5 mm or deeper (e.g., 0.75 mm or deeper, preferably 1.0 mm or deeper, and more preferably 1.5 mm or deeper), the concrete retarder can be said to have the concrete set retarding ability (concrete retarding ability).

Moreover, in the specification, "a concrete set retarder (retardancy, retarding ability, retarding effect, retardative sheet, retardative material)" is sometimes referred to simply as "set retarder (retardancy, retarding ability, retarding effect, retardative sheet, retardative material)" or "retarder" (retardancy, retarding ability retarding effect, retardative sheet, retardative material).

In the specification, the term "agent" usually means a substance or composition which has a certain function or functions, and the term "material" usually means a processed product taking a form suitable for bringing out the best of the function(s) of the agent.

Furthermore, in the specification, the term "pack" means a unitized product made up of a plurality of decorative materials (pieces, members). For example, the term "decorative pack (tile pack)" refers to a packaged (unitized) product composed of a sheet and a plurality of decorative materials or members (tiles) adhered thereon.

BEST MODE FOR CARRYING OUT THE INVENTION

Hereinafter, the present invention will be described in further detail.

Polymer (A)

The concrete set retarder (concrete retarder) of the present invention comprises, as a main component, a polymer (A) having the ability of retarding the set of concrete upon contact with unset concrete (concrete set retardative polymer), and the polymer (A) has adhesion or adhesion properties.

(Adhesive Component)

The polymer (A) has a low glass transition temperature (Tg) component with a Tg of not higher than −5° C. as a structural unit, and this low Tg component makes the polymer (A) adhesive.

In the description of the polymer (A), the expression "a polymer has a low glass transition temperature component with a Tg of not higher than −5° C. as a molecular structure (structural unit)" means that a polymer having the set retarding effect itself has such structure. As to the structure of the polymer; besides the case where a specific block chain, graft chain or crosslinked chain has a low Tg of not higher than −5° C., the expression also includes the case where the Tg of the whole polymer is −5° C. or lower.

The low Tg component is a requirement for giving the polymer (A) adhesion or adhesion properties under the conditions of use. The preferred range of Tg may be different for the conditions of use, and the Tg of the low Tg component is not higher than −5° C. (e.g., −5° C. to −100° C.), preferably −10° C. or lower (e.g., −10° C. to −90° C.), and more preferably −15° C. or lower (e.g., −15° C. to −90° C.).

Moreover, for higher adhesion or better adhesion properties, it is preferable that the surface tensions of the polymer (A) and concrete retarder of the present invention are low. The surface tensions of the polymer (A) and the concrete retarder are, at room temperatures (e.g., 15 to 25° C.), not more than 45 mN/m (e.g., 10 to 45 mN/m), preferably not more than 35 mN/m (e.g., 10 to 35 mN/m), and more preferably not more than 30 mN/m (e.g., 10 to 30 mN/m).

The amount of the low Tg component contained in the polymer (A) is at least 10% by weight or more (about 10 to 70% by weight), preferably 20% by weight or more (about 20 to 60% by weight), and more preferably 30% by weight or more (30 to 60% by weight). When the amount of the low Tg component is small, suitable adhesion or adhesion properties cannot be obtained. Moreover, when the content of the low Tg component is low, the low Tg component may usually be constituted of a hydrophilic or hydrophobic vinyl monomer such as an acrylic acid $C_{2-12}$alkyl ester typified by 2-ethyl-hexyl acrylate (specifically, a vinyl monomer having a Tg of lower than about −20° C.).

As the low Tg component constituting the polymer (A), there may be mentioned a vinyl monomer a homopolymer made from which is a low Tg polymer having a glass transition temperature of not higher than −5° C. (a low Tg vinyl monomer).

When the polymer (A) has a low Tg component as a molecular structure, the low Tg component can be introduced, by chemical bonding, for example, copolymerization, to the main chain or side chain, or to the both of the polymer (A) primarily contributing to the concrete set retarding effect. For example, the low Tg component can be introduced to the polymer (A) in the form of a block chain, crosslinked chain, or a graft chain by copolymerizing a low Tg vinyl monomer and the polymer (A). Moreover, the low Tg vinyl monomer may be uniformly dispersed in the polymer (A) thereby to lower the Tg of the polymer (A) as a whole.

Examples of the low Tg vinyl monomer include acrylates [alkyl acrylates (e.g., acrylic acid $C_{2-12}$alkyl esters such as ethyl acrylate, propyl acrylate, isopropyl acrylate, n-butyl acrylate, hexyl acrylate, octyl acrylate, 2-ethylhexyl acryalte and lauryl acrylate) and hydroxyalkyl acrylates (e.g., acrylic acid hydroxy$C_{2-6}$alkyl esters such as 2-hydroxyethyl acrylate and hydroxypropyl acrylate)] and methacrylates (e.g., mechacrylic acid $C_{6-14}$alkyl esters such as n-hexyl methacrylate)]. Moreover, examples of the low Tg vinyl monomer include vinyl ethers, allyl ethers, such as mono- or diethers of vinyl monomers (e.g., vinyl alcohols, allyl alcohols) and alkylene glycols (e.g., alkylene glycols, polyoxyalkylene glycols). The terminal OH groups of these monoethers may be blocked or capped.

Examples of the low Tg components include residues (segment) of rubber components such as diene-series rubbers (e.g., poly$C_{4-10}$dienes such as polyisoprene, polybutadiene and polyisobutylene), isoprene-series rubbers (e.g., polyisoprene), butadiene-series rubbers (e.g., styrene-butadiene rubber) and isobutylene-series rubbers (e.g., butyl rubber and polyisobutylene), and polyoxyalkylene glycol residues (segment).

(Concrete Set Retardative Component)

The polymer (A) is a concrete set retardative polymer and has a functional group (especially, an acid group) which is able to form a salt with a metal ion (e.g., calcium ions in concrete). Capturing or trapping of calcium ions in concrete retards the set of the concrete.

The species of the acid group is not particularly limited, and there may be exemplified phospholic acid group, sulfonic acid group and carboxyl group. Of these, carboxyl group is preferred. The acid group is not limited to a free acid group and may form a salt, or may be formed by hydrolysis.

In the set retardative polymer used in the present invention, it is preferable that acid groups such as carboxyl groups (including the case where these groups are formed by hydrolysis) are present in such positions that the groups can constitute a chelate structure together with a metal ion. In particular, it is preferable that some or all of the acid groups take up such positions as to mutually form a chelate salt with a divalent metal ion.

The acid group can be introduced to the polymer (A) by, for example, polymerizing (e.g., copolymerizing, graft polymerizing, block polymerizing, crosslinking, or condensation-polymerizing) the polymer (A) and a component having an acid group. As the component having an acid group, use can be made of components having an acid group other than carboxyl group, such as polymerizable monomers having sulfonic acid (e.g., 4-styrene sulfonate), and components having a carboxyl group are usually employed.

As the component having a carboxyl group, there may be exemplified vinyl-series monomers such as (meth)acrylic acid (or esters thereof) and saturated or unsaturated polycarboxylic acids (or esters and anhydrides thereof).

Particularly, examples of the component with which acid groups are introduced to such positions that the acid groups can form a chelate salt with a divalent metal ion are saturated $C_{2-4}$dicarboxylic acids such as malonic acid and succinic acid; unsaturated $C_{4-5}$dicarboxylic acids such as maleic acid, fumaric acid, citraconic acid, mesaconic acid and isaconic acid; and (meth)acrylic acid and esters or anhydrides thereof. The use of the above component with which acid groups are introduced to such positions that the acid groups can form a chelate salt with a divalent metal ion gives the polymer (A) more excellent ability of retarding the set of concrete.

The ratio of the component having an acid group to the low Tg component is, e.g., the former/the latter=about 10/90 to 90/10 (weight ratio), preferably about 20/80 to 80/20 (weight ratio), and more preferably about 30/70 to 70/30 (weight ratio).

(Hydrophilic Component)

The polymer (A) may have a hydrophilic group other than a functional group capable of forming a salt with a metal ion (acid groups such as carboxyl group), and the hydrophilic group gives the polymer (A) the ability of retarding the set of concrete over a long period of time (persistency). The above acid group can make the concrete set retarding ability more persistent as well as the hydrophilic group.

Such hydrophilic group includes hydroxyl group, (poly)oxyalkylene groups, unit or segment, and the like. Moreover, the hydrophilic group includes groups that are able to form hydrophilic groups [particularly, those able to form hydroxyl group or (poly)oxyalkylene groups]. As the group capable of forming a hydrophilic group, there may be exemplified esters of alcohols and (poly)oxyalkylene glycols.

The hydrophilic group can be introduced to the polymer (A) by, e.g., polymerizing (e.g., copolymerizing, graft polymerizing, block polymerizing) the polymer (A) and a component having a hydrophilic group. Moreover, the introduction can be accomplished by the ester condensation of a (polyhydric) alcohol having a hydrophilic group or (poly)carboxylic acid having a hydrophilic group.

As the component having a hydrophilic group, particularly a polymerizable monomer having a hydrophilic group, there may be exemplified unsaturated monomers, for example, esters of unsaturated acids such as (meth)acrylic acid and (polyoxy)alkylene glycols [especially, (polyoxy) $C_{2-4}$alkylene glycols] and ethers of unsaturated alcohols such as allyl alcohol and the above (polyoxy)alkylene glycols.

Examples of the (polyhydric) alcohol having a hydrophilic group include (polyoxy)alkylene glycols and saturated polyhydric alcohols. Examples of the (poly)carboxylic acid having a hydrophilic group include hydroxycarboxylic acids.

The proportion of the component having a hydrophilic group (e.g., polymerizable monomers, alcohols) is, relative to a total of 100 parts by weight of the low Tg component and the component having an acid group, about 0 to 1,000 parts by weight, preferably about 10 to 500 parts by weight, and more preferably about 20 to 100 parts by weight.

The molecular weight of the polymer (A) can usually be selected from within the range of 500 to 1,000,000 and preferably within the range of about 1,000 to 50,000. Incidentally, a polymer (A) of low molecular weight sometimes improves the adhesion or adhesion properties of a polymer (A) of high molecular weight.

The polymers (A) can broadly be classified into two groups: polymers having a low Tg component in the main chain and polymers having a low Tg component in the side chain. The low Tg component may be introduced to both the main and side chains of the polymer. The polymer (A) may be constituted of, e.g., a polyester (e.g., saturated polyester, unsaturated polyester) or a vinyl-series polymer (e.g., acrylic polymer). The unsaturated polyester may be crosslinked by an unsaturated bond to form a polymerized unsaturated polyester (e.g., crosslinked unsaturated polyester, graft polymerized unsaturated polyester). Moreover, the vinyl-series polymer can be constituted of a copolymer of at least one copolymerizable monomer selected from acrylic acid, methacrylic acid, maleic acid, and esters and anhydrides thereof.

Polymer (A) Having a Low Tg Component in the Main Chain

To be more concrete, the method of introducing a low Tg component as an adhesive component to a concrete set retardative polymer, and the concrete set retardative polymer obtained by this method will be described with reference to examples. As to the concrete way of introducing a low Tg component with a Tg of −5° C. or lower to the main chain of a set retardative polymer, when the set retardative polymer is a vinyl-series polymer, copolymerization using a low Tg component corresponding to a homopolymer having a Tg of not higher than −5° C. is employed. When the set retardative polymer is a polyester-series polymer, there may be exemplified polymers using a low Tg component with a Tg of not higher than −5° C. as a dicarboxylic acid or diol. In the former case, as the low Tg component (vinyl monomer), use can be made of the aforementioned low Tg vinyl monomers. In the latter case, as the low Tg component (diol component), there may be mentioned, for example, a polyethylene glycol with its terminal non-capped. Hereinafter, the vinyl-series polymer and polyester each having a low Tg component with a Tg of not higher than −5° C. in the main chain of the set retardative polymer will be described in further detail.

(Vinyl-series Polymer)

When the polymer (A) is a vinyl-series polymer, the vinyl-series polymer (A) may be constituted of a polymerizable monomer having an acid group for giving the concrete set retarding ability and a low Tg vinyl monomer for imparting adhesion or adhesive properties.

As the polymerizable monomer having an acid group for forming the vinyl-series polymer (A), there may be exemplified polymerizable unsaturated monomers having an acid group capable of capturing or trapping a calcium ion, such as phosphoric acid group, sulfonic acid group and carboxyl group. The acid group of a polymerizable monomer may be a free acid group and may form a salt, an acid anhydride, an ester group, etc.

The polymerizable monomer having an acid group may be a polymerizable monomer having a sulfonic acid group (e.g., styrene sulfonic acid or a salt thereof), and there may be exemplified the aforementioned polymerizable monomers having a carboxyl group and derivatives thereof. Particularly, use can be made of (meth)acrylic acid and acid anhydrides thereof, acrylic acid esters (e.g., acrylic acid $C_{1-6}$alkyl esters, acrylic acid hydroxy$C_{2-6}$alkyl esters), methacrylic acid esters (e.g., methacrylic acid $C_{1-6}$alkyl esters, methacrylic acid hydroxy$C_{2-6}$alkyl esters), unsaturated dicarboxylic acids (unsaturated $C_{4-5}$dicarboxylic acids such as maleic acid, citraconic acid, mesaconic acid, isaconic acid), or anhydrides thereof or esters (mono- or diesters) thereof.

The low Tg component capable of giving adhesion or adhesion properties to the vinyl-series polymer (A) can be introduced to the polymer (A) by copolymerizing the polymer (A) and a monomer corresponding to a homopolymer having a Tg of not higher than −5° C.

As the monomer corresponding to a homopolymer having a Tg of not higher than −5° C., there may be exemplified the same monomers as the low Tg vinyl monomers mentioned above. Particularly, there may be exemplified $C_{2-12}$alkyl esters of acrylic acid (e.g., ethyl acrylate, isopropyl acrylate, n-butyl acrylate, 2-ethylhexyl acrylate), methacrylic acid $C_{6-14}$alkyl esters (e.g., n-hexyl methacrylate, lauryl methacrylate), acrylic acid hydroxy$C_{2-6}$alkyl esters (e.g., 2-hydroxyethyl acrylate, hydroxypropyl acrylate), vinyl ethers, allyl ethers, vinyl esters and allyl esters. Moreover, when producing the vinyl-series polymer by polymerization, a rubber component such as polyisoprene rubber, styrene-butadiene rubber, butyl rubber, and polyisobutyrene may be allowed to coexist in the polymerization system thereby to introduce a residue (segment) of the rubber component to the polymer.

The vinyl-series polymer (A) having a low Tg component in the main chain so obtained may further be graft polymerized with or crosslinked by the low Tg vinyl monomer.

The proportion of the low Tg vinyl monomer in the vinyl-series polymer (A) is the same as that of the low Tg component in the aforementioned polymer (A).

Moreover, the ratio of the polymerizable vinyl monomer having an acid group to the low Tg vinyl monomer may be the same as that of the component having an acid group to the low Tg component, and may be (Polymerizable vinyl monomer having an acid group)/ (Low Tg vinyl monomer)= about 30/70 to 80/20 (weight ratio), preferably about 50/50 to 80/20 (weight ratio), and more preferably about 60/40 to 70/30 (weight ratio).

To the vinyl-series polymer (A) may be introduced a hydrophilic group. The concrete set retardancy, particularly the persistence of the set retarding ability can be improved by giving hydrophilicity. The hydrophilic group can be introduced by copolymerizing the aforementioned polymerizable monomer having a hydrophilic group, particularly an unsaturated monomer such as an ester of (meth)acrylic acid and a $C_{2-4}$alkylene glycol or polyethylene glycol (degree of polymerization: about 2 to 10, its terminal may be capped); an ether of an unsaturated alcohol (e.g., allyl alcohol) and a $C_{2-4}$alkylene glycol or polyethylene glycol (degree of polymerization: about 2 to 10, its terminal may be capped), or an unsaturated polyhydric alcohol.

When introducing a hydrophilic group, the hydrophilic group may be introduced together with a polymerizable monomer having an acid group. For example, a mono- or diester of a polymerizable monomer having an acid group (e.g., acrylic acid, methacrylic acid) and a (polyoxy)alkylene glycol, or a mono- or diether of a vinyl alcohol or allyl alcohol and a (polyoxy)alkylene glycol may be copolymerized.

The amount of the hydrophilic group-containing monomer used is, relative to a total of 100 parts by weight of the polymerizable monomer having an acid group and the low Tg vinyl monomer, about 0 to 1,000 parts by weight, preferably about 10 to 500 parts by weight, and more preferably about 20 to 100 parts by weight.

The monomers constituting the vinyl-series polymer (a monomer for providing the concrete set retarding ability, a monomer for giving adhesion or adhesion properties, and a monomer for imparting hydrophilicity) may partly have the same functions, depending on the species of the functional group. A plurality of monomers having the common functions give a plurality of properties to the vinyl-series polymer (A).

So long as the concrete set retarding ability and adhesion properties are not adversely affected, the vinyl-series polymer (A) may be a copolymer with a polyemerizable unsaturated monomer (the third component) other than the above monomers. For example, polymerization of the third component monomer with the above monomers sometimes improves the polymerizability.

As the third component (polyemerizable unsaturated monomer), there may be mentioned, for example, aromatic vinyl-series monomers (e.g., styrene), acrylonitrile-series monomers (e.g., acrylonitrile), vinyl ester-series monomers (e.g., vinyl acetate), vinyl chloride-series monomers, and olefinic monomers.

The amount of the third component used is, for example, 50 parts by weight or less, preferably 30 parts by weight or less, and more preferably 20 parts by weight or less, relative to a total of 100 parts by weight of a monomer having an acid group and a low Tg monomer.

The aforementioned monomers can easily be polymerized by various polymerization methods, for example, by heating in the presence of a radical generator (e.g., a peroxide) and in the presence or absence of a solvent. Usually, the polymerization is effected by, in the presence of a solvent (e.g., about 10 to 300 parts by weight of a solvent relative to 100 parts by weight of the monomer), gradually adding the monomers containing-a peroxide dropwise with stirring.

The molecular weight of the vinyl-series polymer (A) is not particularly limited, and may for example be about 1,000 to 1,000,000, preferably about 5,000 to 100,000, and more preferably about 10,000 to 50,000 in terms of the number average molecular weight (the molecular weight on polystyrene basis measured by gel permeation chromatography. Hereinafter, the same definition unless stated otherwise).

(Polyester (Saturated or Unsaturated Polyester))

When the polymer (A) having a low Tg component in the main chain is a polyester, a carboxyl group generated by the hydrolysis of the polyester gives the concrete set retarding ability. Therefore, it is preferable that the polyester constituting the polymer (A) is relatively easily hydrolyzed with an alkali of concrete.

The polyester can be obtained by a reaction between a polycarboxylic acid containing at least a dicarboxylic acid component and a polyol containing at least a diol component. As the dicarboxylic acid component, there may be exemplified saturated or unsaturated polycarboxylic acids having 2 to 6 carbon atoms (particularly, saturated or unsaturated dicarboxylic acids). When the number of carbons of the dicarboyxlic acid is about 2 to 6, polyester is easily hydrolyzed and given a high concrete set retarding ability.

Examples of the saturated dicarboxylic acid component having 2 to 6 carbon atoms include aliphatic saturated dicarboxylic acids such as oxalic acid, malonic acid, succinic acid, glutaric acid, and adipic acid. Examples of the unsaturated dicarboxylic acid component having about 2 to 6 carbon atoms include aliphatic unsaturated dicarboxylic acids such as maleic acid, fumaric acid, citraconic acid, mesaconic acid, and itanoic acid. The dicarboxylic acid component may be an acid anhydride. These dicarboxylic acid components may be used either singly or in combination.

Moreover, as the diol component constituting the polyester, there may be mentioned diol components that are capable of enhancing the hydrolyzability of the polymer (A), such as saturated or unsaturated polyhydric diols having about 2 to 4 carbon atoms, and condensates thereof.

Examples of the saturated diol having 2 to 4 carbon atoms and condensate thereof include alkylene glycols (e.g., ethylene glycol, propylene glycol, 1,2-propanediol, 1,3-butanediol, tetramethylene glycol), polyoxyalkylene glycols (e.g., polytetramethylene glycol), polyethylene glycols (e.g., diethylene glycol, triethylene glycol), and polypropylene glycols (e.g., dipropylene glycol and tripropylene glycol).

As the unsaturated diol having 2 to 4 carbon atoms and condensate thereof, there may be mentioned dehydrides of the glycols set forth, e.g., alkenediols typified by ethenediol, propenediol, and butenediol, and condensates thereof.

These diol components may be used either singly or in combination.

The preferred diol component includes condensates, for example, dimers to decamers, preferably dimers to hexamers and more preferably dimers to trimers. Moreover, the preferred diol component includes asymmetric diols such as 1,2-propanediol and 1,3-butanediol.

The above dicarboxylic acid components and diol components may be used in combination with another polycarboxylic acid, polyol, etc. Examples of the other polycarboxylic acid (particularly, dicarboxylic acid) include polycarboxylic acids having more than 6 carbon atoms, such as aliphatic dicarboxylic acid such as sebacic acid; alicylic dicarboxylic acids such as cyclohexanedicarboxylic acid; aromatic dicarboxylic acids such as phthalic acid, terephthalic acid and isophthalic acid. As the polycarboxylic acid, use can be made of compounds having three or more than three carboxyl groups such as pyromellitic acid.

Examples of the other polyol include diols having five or more than five carbon atoms, such as aliphatic diols typified by hexanediol; alicyclic diols such as cyclohexandiol, cyclohexanedimethanol; and aromatic diols such as adducts of bisphenols (e.g., bisphenol A) and $C_{2-4}$alkylene oxides. Examples of the other polyhydric alcohol further include polyhydric alcohols having three or more than three hydroxyl groups, such as triols and tetraols (e.g., glycerol, trimethylolpropane, and pentaerythritol).

If necessary, to the polyester-series polymer (A) may be introduced a compound having the concrete set retarding ability (concrete set retarder) such as a hydroxycarboxylic acid and a keto acid as a carboxylic acid component and/or an alcohol component.

The polyester constituting the polymer (A) of the present invention can be obtained by the condensation of the polycarboxylic acid component and diol component. For example, the polyester can be produced by, for example, mixing a predetermined amount of the dicarboxylic acid component (preferably, anhydride) with a predetermined amount of the diol component, heating the mixture in the presence of a catalyst (e.g., dibutyl tin oxide) to a suitable temperature (e.g., about 130 to 190° C.) with stirring in a stream of an inert gas (e.g., nitrogen gas), and continuously draining water generated from the system. The reaction time differs for ways of draining the generated water, and is usually about 5 to 20 hours when the reaction is conducted at atmospheric pressure.

As was described above, when the polymer (A) is a polyester-series polymer, an acid group (carboxyl group) is produced upon the hydrolysis of the main chain of the polyester. The acid group captures a calcium ion in concrete and the set of the concrete is retarded or delayed. So long as the polyester contains a low Tg component in the main chain, if necessary, a monomer having an acid group which contributes to the retardation of curing or setting may further be introduced to the polyester. For example, the polyester (particularly, an unsaturated polyester) may be graft polymerized or crosslinked using the polymerizable monomer having an acid group mentioned when discussing about the vinyl-series polymer.

Another low Tg component or polymer chain containing a low Tg component may further be linked to the terminal group of the polyester-series polymer (A), thereby further improving the adhesion or adhesion properties.

The ratio of the polycarboxylic acid to the polyol in the polyester-series polymer (A) is, for example, about 0.8/1 to 1.2/1 (molar ratio) and preferably about 0.9/1 to 1.1/1 (molar ratio).

The molecular weight of the polyester is not particularly limited. For example, the molecular weight is about 500 to 50,000, preferably about 700 to 30,000, more preferably about 1,000 to 20,000, and particularly about 1,000 to 5,000, in terms of number average molecular weight on polystyrene basis.

When the polyester is an unsaturated polyester, the molecular weight may be, in terms of number average molecular weight on polystyrene basis, 2,000 or less (e.g., about 300 to 2,000), preferably 1,500 or less (e.g., about 350 to 1,500), and more preferably 1,000 or less (e.g., about 400 to 1,000). A molecular weight of 2,000 or less can give high adhesion or high adhesion properties.

Polymer (A) Having a Low Tg Component in the Side Chain

In the case where there exists a double bond in the set retardative polymer (e.g., the unsaturated polyesters, particularly, unsaturated polyesters comprising non-condensed polyhydric alcohol components), a low Tg component can be introduced to the side chain by, e.g., allowing the set retardative polymer (e.g., an unsaturated polyester) to contain a vinyl monomer a homopolymer formed from which is a low Tg polymer having a glass transition temperature of −5° C. or lower (low Tg vinyl monomer), or impregnating the set retardative polymer with the above vinyl polymer. Moreover, a low Tg component can be introduced to the side chain by polymerizing (e.g., graft polymerizing, crosslinking) a set retardative polymer (e.g., an unsaturated polyester) with a low Tg vinyl monomer. For example, the introduction of a low Tg component can be effected by grafting using a solution of a vinyl monomer, the set retardative polymer (e.g., an unsaturated polyester) and a radical generator, e.g., a peroxide. In the polymerization, the set retarding polymer (e.g., unsaturated polyester) may be crosslinked or graft polymerized with the vinyl monomer.

Even in the case of a polymer having no double bond (e.g., a vinyl-series polymer), the introduction of a low Tg component can be effected by graft polymerization (or an addition reaction, condensation reaction, etc.).

As the low Tg vinyl monomer, there may be exemplified the low Tg vinyl monomers mentioned when discussing about the polymer (A).

The proportion of the low Tg vinyl monomer in the polyester-series polymer (A) is the same as that of the low Tg component in the aforementioned polymer (A).

In the graft polymerization of the set retardative polymer (e.g., unsaturated polyester) with the low Tg vinyl monomer, another vinyl monomer may be used together if necessary. Even when the compatibility of the set retardative polymer (e.g., unsaturated polyester) with these low Tg vinyl monomers is low, the compatibility can be improved by the use of another vinyl monomer. For example, in the case of an unsaturated polyester formed by condensation polymerizing propylene glycol and maleic anhydride, the compatibility between the unsaturated polyester and 2-ethylhexyl acrylate is considerably poor. In this case, after allowing the unsaturated polyester to contain e.g., hydroxyethyl methacylate as the other vinyl monomer for improving the compatibility, or impregnating the unsaturated polyester with hydroxyethyl methacrylate, 2-ethylhexyl acrylate is added, and there can be obtained a suitable polymer/monomer mixture (of high compatibility). The other vinyl monomer can be used together even when not aiming at improving the compatibility.

Examples of the other vinyl monomer include (meth) acrylic acid, acrylates (e.g., methyl acrylate), methacrylates [e.g., alkyl methacrylates (e.g., methacrylic acid $C_{1-5}$alkyl esters such as methyl methacrylate, ethyl methacrylate, isopropyl methacrylate, and n-butyl methacrylate) and methacrylic acid hydroxy$C_{1-20}$alkyl esters such as 2-hydroxyethyl methacrylate and hydroxypropyl methacrylate)], (meth)acrylic acid anhydride, maleic anhydride, maleic acid and esters thereof, fumaric acid and esters thereof, vinyl esters (e.g., vinyl acetate), and aromatic vinyl compounds (e.g., styrene). The other vinyl monomer incorporated into the retarder improves the set retarding ability, and When separating the retarder once adhered to an object, the other vinyl monomer often prevents the adhesive set retardative polymer from sticking to the object.

The proportion of the other vinyl monomer further added is, relative to 100 parts by weight of the set retardative polymer (e.g., unsaturated polyester), e.g., about 50 parts by weight or less, preferably about 30 parts by weight or less, and more preferably about 20 parts by weight or less.

The low Tg vinyl monomer and the other vinyl monomer can be polymerized (e.g., graft polymerized, crosslinked) with the set retardative polymer (e.g., unsaturated polyester) according to a conventional polymerization method, e.g., by bulk or mass polymerization. To give an example, a predetermined amount of an unsaturated polyester is dissolved in a predetermined amount of a vinyl monomer to be polymerized (e.g., graft polymerized, crosslinked) and the resulting mixture is then polymerized in the presence of a polymerization initiator (when polymerizing by heating, the initiator is, e.g., a peroxide; when polymerizing using ultraviolet ray, the initiator is, e.g., a photopolymerization initiator). As the polymerization (e.g., graft polymerization, crosslinking) of the set retardative (or retarding) polymer (e.g., unsaturated polyester) proceeds, the polymer (A) solidifies. Therefore, usually, the polymerization reaction is not effected in a flask but the mixture (if necessary, it contains other additives) is applied onto a substrate suitable for end use (e.g., films, sheets) and polymerized (e.g., graft polymerized, crosslinked), or the substrate is impregnated with the mixture and the mixture is polymerized (e.g., graft polymerized, crosslinked).

When the compatibility with the set retardative polymer is good, a polymer having a double bond and a low Tg of −5° C. or lower (a low Tg polymer) such as polyisoprene, butadiene rubber, butyl rubber, nitrile rubber and chloroprene rubber may be used instead of the above low Tg vinyl monomer, or used together with the low Tg vinyl monomer. In the case of using a low Tg polymer, the polymer (A) can be constituted by graft polymerizing or crosslinking the low Tg polymer with a set retardative polymer (e.g., an unsaturated polyester) using for example a peroxide (radical generator) or sulfur.

The proportion of the low Tg polymer is, for example, about 0 to 300 parts by weight, preferably about 0 to 200 parts by weight, and more preferably about 0 to 100 parts by weight relative to 100 parts by weight of the set retardative polymer (e.g., unsaturated polyester).

In the case where the polymer (A) is a polymer (e.g., crosslinked polymer, graft polymer) of an unsaturated polyester, the provision of hydrophilicity to the polymer (A) can be accomplished by, for example, either way of the following two (or both).

In the first method, a hydrophilic group can be introduced to a graft chain or crosslinking chain of the polymer (A) by polymerizing (e.g., graft polymerizing, crosslinking) an unsaturated polyester and an unsaturated monomer having a hydrophilic group.

As the unsaturated monomer having a hydrophilic group, there may be exemplified the aforementioned monomers, such as esters of unsaturated carboxylic acids typified by (meth)acrylic acid and $C_{2-4}$alkylene glycols or polyethylene glycols (degree of polymerization: about 2 to 10, their terminals may be capped), ethers of unsaturated alcohols such as allyl alcohol and $C_{2-4}$alkylene glycols or polyethylene glycols (degree of polymerization: about 2 to 10, their terminals may be capped), and other unsaturated polyhydric alcohols.

In the second method, a hydrophilic group can be introduced to the main chain of a polyester by employing a polyoxy $C_{2-4}$alkylene glycol (degree of polymerization: about 2 to 10) as a diol component constituting the polyester. In this case, the hydrophilicity of the polymer (A) is controlled by the degree of polymerization of the polyoxyalkylene glycol. Moreover, the hydrophilicity of the polymer (A) can also be controlled by using the polyoxyalkylene glycol together with another polyoxyalkylene glycol with a different degree of polymerization, or together with another diol component.

The functions of these monomers capable of imparting hydrophilicity and those of the monomers for giving adhesion or adhesion properties (low Tg vinyl monomers) may partly be the same.

When the polymer (A) is a crosslinked unsaturated polyester (graft polymer), the adhesion or the adhesion properties of the crosslinked unsaturated polyester (graft polymer) can be further improved by using an unsaturated polyester with the average number of unsaturated bonds (polymerizable C—C double bonds) per molecule (unsaturated bond number) being small (highly adhesive crosslinked unsaturated polyester (graft polymer)).

The number of unsaturated bonds per molecule of the unsaturated polyester on average is 8 or less, (about 0.5 to 8), preferably 7 or less (about 0.5 to 7), more preferably 6 or less (about 1 to 6), and specifically 5 or less (about 1 to 5). When adding a saturated compound compatible with an unsaturated polyester (this will be described below), higher adhesion or adhesion properties can be given by the use of an unsaturated polyester having not more than five unsaturated bonds (about 0.5 to 5). Moreover, even without the additive (saturated compound), higher adhesion can be given to the polymer (A) by using an unsaturated polyester having 3 or less than three unsaturated bonds (about 0.5 to 3).

When using a plurality of unsaturated polyesters in combination, an unsaturated polyester having more than eight unsaturated bonds may be used in combination with an unsaturated polyester having such a small number of unsaturated bonds as to make the average number of unsaturated bonds of the unsaturated polyester composition as a whole eight or less.

When, for example, the unsaturated polyester is constituted of an unsaturated diol A (one C—C double bond), a saturated diol B, an unsaturated dicarboxylic acid C (one C—C double bond), and a saturated dicarboxylic acid D, the number of unsaturated bonds of the unsaturated polyester, particularly the number of double bonds (the double bond number) can be figured out by using the following formula:

Double bond number (DB)=(the number of ester units per molecule of unsaturated polyester)×(the ratio or proportion of the double bond of the diol component+the ratio or proportion of the double bond of the dicarboxylic acid component)=

$[Mn/(M_A \times m_A + M_B \times m_B + M_C \times m_C + M_D \times m_D)] \times [m_A/(m_A + m_B) + m_D/(m_C + m_D)]$ wherein Mn is the number average molecular weight of the unsaturated polyester; $M_A$, $M_B$, $M_C$, and $M_D$ represent the molecular weights of the unsaturated diol A, saturated diol B, unsaturated dicarboyxlic acid C, and the saturated dicarboxylic acid D, respectively. $m_A$ and $m_B$ stand for the ratios (molar ratio) of the unsaturated diol A and saturated diol B relative to the diol component, respectively, and $m_A + m_B = 1$. $m_C$ and $m_D$ represent the ratios (molar ratio) of the unsaturated dicarboxylic acid C and saturated dicarboxylic acid D relative to the dicaroboxylic acid component, and $m_C + m_D = 1$.

The number average molecular weight Mn can be determined by gel permeation chromatography (on styrene basis). Moreover, $m_A$, $m_B$, $m_C$ and $m_D$ can be figured out by measuring $^1$H-NMR spectrum of the unsaturated polyester.

Strictly speaking, due to the occurrence of dehydration upon condensation, the values of $M_A$ to $M_D$ vary depending on whether the components A to D are positioned at the terminals or not. However, for convenience, the molecular weights of the components before the condensation are employed as the values of $M_A$ to $M_D$ of the above formula.

When diol and dicarboxylic acid components different from those employed above are used (e.g., when a total of five or more than five diol and dicarboxylic acid components are used, or when the unsaturated diol component or unsaturated dicarboxylic acid component has two or more than two C—C double bonds), the number of unsaturated bonds (double bond number) can be figured out by using the above formula suitably modified.

The number of unsaturated bonds per molecule of the unsaturated polyester can be adjusted by, for example, the following methods: (1) a method in which a saturated dicarboxylic acid and an unsaturated dicarboxylic acid are used in combination as the carboxylic acid component of the unsaturated polyester, and the ratio thereof is adjusted; (2) a method in which a saturated diol and an unsaturated diol are used in combination as the diol component of the unsaturated polyester, and the ratio thereof is adjusted, (3) a method in which the mean degree of polymerization of the saturated polyalkylene glycol to be used is adjusted; and (4) a method in which the molecular weight of the unsaturated polyester is adjusted. These methods can also be employed in suitable combinations.

Examples of the unsaturated dicarboxylic acid component of an unsaturated polyester constituting a highly adhesive crosslinked unsaturated polyester are similar to those of the dicarboxylic acid component constituting the polyester. Of the examples of the dicarboxylic acid component, as the unsaturated dicarboxylic acid component, there may be mentioned aliphatic unsaturated dicarboxylic acids typified by maleic acid, fumaric acid, citraconic acid, mesaconic acid, and itaconic acid, and anhydrides thereof. Moreover, as the saturated dicarboxylic acid component, there may be mentioned, for example, aliphatic saturated dicarboxylic acids such as aliphatic saturated $C_{2-6}$dicarboxylic acids typified by oxalic acid, malonic acid, succinic acid, glutaric acid, and adipic acid.

Further, examples of the diol component constituting the unsaturated polyester are those mentioned when discussing about the diol which constitutes the polyester. Of these diol components, examples of the saturated diol are aliphatic diols (glycols), such as $C_{2-4}$alkylene glycols (ethylene glycol, propylene glycol, 1,3-butanediol, teteramethylene glycol), and polyoxy$C_{2-4}$alkylene glycols (e.g., polyethylene glycol, polypropylene glycol, polytetramethylene glycol). Moreover, as the unsaturated diol, there may be exemplified dehydrides of the glycols set forth, such as alkenediols typified by ethenediol, propenediol, butenediol, pentenediol, hexenediol, and condensates thereof.

As to a combination of monomers suitable for adjusting the number of unsaturated bonds of the unsaturated polyester, it is preferable to use maleic acid (anhydride) as the unsaturated component, succinic acid (anydride) and the saturated diol as the saturated component in a suitable combination. The proportions of succinic acid (saturated dicarboxylic acid) and maleic acid (unsaturated dicarboxylic acid) are controllable according to the range of the number of unsaturated bonds (e.g., not more than eight). However, for further improving the set retardancy of the polymer (A), the proportion of maleic acid (anhydride) relative to the whole dicarboxylic acid component is 30 mol % or more, preferably 40 mol % or more, more preferably 50 mol % or more, and particularly 60 mol % or more.

Moreover, when adjusting the number of unsaturated bonds according to the mean degree of polymerization of a saturated polyalkylene glycol, usually, the number of unsaturated bonds is adjustable by using a suitable combination of polyethylene glycols of various degrees of polymerization (e.g., diethylene glycol, triethylene glycol, PEG100, PEG200, PEG400).

On the other hand, when adjusting the number of unsaturated bonds according to the molecular weight, the number of unsaturated bonds can be adjusted by polymerizing the composition until the molecular weight thereof reaches the value figured out using the formula of the double bond number (DB). For ease of handling (convenience) in the next step (graft polymerization reaction, crosslinking reaction) which will be described below, or improvements in the performance of the concrete retarder, the number average molecular weight of the unsaturated polyester is different from that of the unsaturated polyester having a low Tg component in the main chain, and is usually about 300 to 5,000, preferably about 400 to 3,000, and more preferably about 500 to 2,000.

To give the concrete set retarding ability, the unsaturated polyester is constituted of a $C_{2-6}$dicarboxylic acid and a (polyoxy)$C_{2-4}$alkylene glycol. However, as was described above, the dicarboxylic acid and (polyoxy)alkylene glycol may be used in combination with another polycarboxylic acid, another polyol, etc. For example, the other polycarboxylic acid includes phthalic acid, terephthalic acid, and isophthalic acid. Since these polycarboxylic acids have unsaturated bonds but do not contribute to the crosslinking, these can be used for adjusting the number of unsaturated bonds.

The other polyol includes diols having seven or more than seven carbon atoms. These polyols may also be used when adjusting the number of unsaturated bonds.

The sum of the amounts of the other polycarboxylic acid and the other polyol is, relative to a total of 100 parts by weight of a $C_{2-6}$dicarboxylic acid and a (polyoxy)$C_{2-4}$dicarboxylic acid, for example, about 0 to 30 parts by weight, preferably about 0 to 25 parts by weight, and more preferably about 0 to 20 parts by weight.

Concrete Retarder Comprising Polymer (A) as the Main Component

So long as the concrete retarder of the present invention contains the above polymer (A) as the main component (e.g., about 50 to 100% by weight, preferably about 70 to 100% by weight, and more preferably about 80 to 100% by weight), the retarder may also be used as a composition containing an additive,. The following component is an example of the additive.

1) Tackifier

The polymer (A) of the present invention itself is adhesive or has adhesion properties, hence the concrete retarder containing the polymer (A) is adhesive or has adhesion properties. However, the adhesion properties or adhesion can be further improved by further adding a tackifier to the polymer (A).

As the tackifier, use can be made of saturated compounds compatible with the polymer (A) [compounds having no reactive carbon-carbon unsaturated bond (e.g., carbon-carbon double bond)], such as esters (esters of acetic acid such as ethyl acetate; saturated polyesters having a number average molecular weight lower than that of the above-mentioned saturated polyester, such as low molecular weight saturated polyesters having a number average molecular weight of about 200 to 1,000), and organic solvents such as aromatic hydrocarbons typified by toluene, and ketones. The amount of the tackifier used is, relative to 100 parts by weight of the polymer (A), for example, about 0 to 50 parts by weight, preferably about 1 to 20 parts by weight, and more preferably about 3 to 10 parts by weight.

2) Other Additives

Besides the above tackifier, to the concrete retarder of the present invention may be added colorants such as dyes and pigments, a variety of stabilizers, plasticizers, fillers such as inorganic particulates and organic particulates, and processibility improving agents for making the processing of retarders into sheets easier. The plasticizer (particularly, a saturated compound) improves the adhesion or the adhesion properties of the concrete retarder.

Further, when the polymer (A) is a vinyl-series polymer, the concrete retarder may be a composition of the polymer (A) and a solvent. Furthermore, in the case where the polymer (A) is a crosslinked (graft polymerized) unsaturated polyester, the retarder may be a mixture before being crosslinked, e.g., a solution of an unsaturated polyester (constituting the main chain of the crosslinked polymer or graft polymer) dissolved in a low Tg monomer (constituting a crosslinked chain or graft chain of the crosslinked polymer or graft polymer). Such concrete retarders may be liquids that may be tacky, or solids that may be in the form of particulates.

As has been described, the agent (e.g., concrete retarders and compositions comprising the same) may suitably be processed and made into a material (a product having the concrete set retarding ability). Considering the characteristics of the agent (concrete retarder), the material in the form of a sheet is the most desired.

Concrete Retardative Sheet

The concrete retarder having adhesion or adhesion properties of the present invention is preferably used in the form of, e.g., a film, tape, or a sheet. Although it is possible to make the concrete retarder itself into a film or sheet, for ease of processing, it is more convenient to apply an adhesive concrete retarder onto a base film or sheet of a synthetic resin. In other words, it is preferable that a layer comprising the concrete retarder is formed on a non-tacky (adhesive) sheet. To give an example, when the polymer (A) is a vinyl-series polymer, a dope of the vinyl-series polymer produced by solution polymerization is applied onto a sheet or the sheet is impregnated with the dope. The sheet is heated if necessary, and then dried. Moreover, when the polymer (A) is a crosslinked (graft polymerized) unsaturated polyester, a mixture of an unsaturated polyester, a monomer and a polymerization initiator is applied onto a sheet or the sheet is impregnated with the mixture, and the mixture is set (polymerized, crosslinked) by heating or irradiation with ultraviolet ray.

The concrete retardative sheet (concrete set retardative sheet) may be formed by interposing a layer comprising the concrete retarder between two non-tacky (adhesive) sheets. In the concrete retardative sheet having such structure, at least one of the non-tacky sheets may be separable.

The concrete retardative sheet may be made by forming a set retardative layer having adhesion or adhesion properties on one surface of a base film or sheet and another adhesive layer on the other surface. In this case, the adhesive layer on the other surface may have or may not have the concrete set retarding ability, and may be a layer of a bonding agent.

Furthermore, the adhesive concrete retardative sheet may be constituted of a layer of an adhesive concrete retarder and a film or sheet which itself is adhesive.

The species of the polymer constituting a base film or sheet is not particularly limited, and examples of which are olefinic polymers such as polyethylene and polypropylene, polyesters such as polyethylene terephthalate and polybutylene terephthalate (particularly, polyalkylene terephthalate), ethylene-vinyl acetate copolymer, ethylene-acrylic acid copolymer, acrylic resins, polystyrenes, polyvinyl chlorides, polyamides, polycarbonates, polyvinyl alcohols, and ethylene-vinyl alcohol copolymers. These polymers can be used singly or as a combination of two or more species.

As the base film or sheet, a set retardative film or sheet constituted of the polymer having the set retarding ability, or a film or sheet containing the retarder can also be used.

As the substrate film or sheet, for example, a laminated film formed by laminating one side or both sides of a cloth woven out of the fiber of, e.g., polyethylene with the polyethylene film or sheet or the like may be used. Moreover, the base film or sheet may be a film improved in tearability and dimensional stability.

The base film or sheet may be a single film or sheet or a laminated composite film or sheet constituted of a plurality of layers. Moreover, the base film or sheet may be an unstretched film or sheet, or an uniaxially or biaxially stretched film or sheet. Further, the substrate film or sheet may be a woven cloth or non-woven cloth made of stretched or non-stretched yarn.

The surfaces of these base films or sheets may be treated to enhance their adhesion to the retarder by, e.g., flame treatment, corona discharge treatment, or plasma treatment. The surface tensions of the surface-treated base films or sheets are usually about 40 mN/m or higher.

The set retardative layer of the adhesive retarder may be separable from the base film or sheet. When the set retardative layer is separable from the base film or sheet, a film or sheet with the desired pattern is placed inside a form (e.g., a set retardative layer, set retardative sheet, set retardative film or the like is cut in the desired pattern and unwanted parts are delaminated and removed from the film or sheet, and the resultant sheet or film is laid inside a form), an inorganic curable composition (e.g., a mortar composition) is cast or poured into the form and set, and the surface of the set or cured concrete product which is in contact with the film or sheet is washed thereby to give a washed-out surface with patterns and aggregates (e.g., decorative materials) exposed at the sites corresponding to the areas left uncut. To make the set retardative layer separable, the surface of the base film may be an untreated one, or may be treated with, e.g., a surface lubricant such as wax, a higher fatty acid amide or silicone oil. The surface tension of the base film or sheet is, correlated with the adhesion strength of the set retardative layer, usually, e.g., 38 mN/m or lower, preferably about 20 to 38 mN/m, and more preferably about 25 to 36 mN/m.

Decorative Pack (Kit)

A decorative pack (e.g., tile pack) can be obtained by adhering a plurality of decorative materials (e.g., tiles), their dressed surface as the adherends, to the set retardative layer surface of the concrete retardative sheet.

In the case of a conventional tile pack composed of a sheet onto which an adhesive having no concrete set retarding ability is applied and tiles adhered thereon, the joint sections between the tiles usually require treatment, e.g., filling the joint sections between the tiles with tapes cut from a foam resin sheet. In some cases, the joints are treated using a foam sheet, etc. In contrast to the above, when using the concrete retardative sheet of the present invention, since the sheet itself has sufficient set retarding ability, in the production of tile-dressed panels for concrete which will be described below, the set of mortar between the tiles is inhibited for a depth of several milimeter from the set retardative sheet. Therefore, when fabricating a decorative pack (e.g., tile pack) using the retardative sheet of the present invention, in many cases, a process of treating joints using a foam sheet can be eliminated.

Incidentally, instead of using tiles, a decorative pack (or decorative material pack) may be fabricated by adhering decorative materials (members, pieces) other than tiles on the concrete retardative sheet, or may be produced using both decorative materials and tiles together. As the decorative materials (members, pieces), there may be exemplified metal plates (pieces), glass plates (glass pieces, particulate or bead-like glass), wood pieces, natural stones (plates, pieces), resin plates (sheets, particulate resins, laminated plates), and ceramices. The decorative materials are regularly or randomly adhered to the retardative layer.

In the decorative pack of the present invention, the gaps (joint sections) between the tiles need not be filled with tapes or a net made from a foam resin sheet (joint treatment), but the joints may be treated if necessary.

Process for Producing Concrete Panels Utilizing Decorative Packs

The decorative pack (e.g., tile pack) can be utilized in the production of concrete products (decorative or ornamental concrete products), particularly of precast concrete panels. To give an example, the decorative pack (e.g., tile pack) is laid inside a form with its decorative material (or member) side (tile side) facing inward or upward, a reinforcement is arranged if necessary, and concrete is cast or deposited and left for a set. Thereafter, the set or cured concrete (concrete panel) is detached from the form, the concrete retardative sheet covering the surfaces of the decorative materials (tiles) is peeled off, and the unset mortar component remaining on the surfaces of the decorative materials (tiles) is washed away, if necessary, using high pressure water or a brush, thereby giving a concrete product (panel) [decorative concrete product (panel)], particularly a precast concrete (PC) panel. As can be understood from the above, the use of the decorative pack (tile pack) of the present invention enables the removal (wash-down) of the mortar filling up the joints and the mortar component remaining on the tile surface. The decorative pack of the present invention does not require the treatment of the joints using, e.g., a foam sheet and therefore the joints sections can be formed with ease and high precision.

INDUSTRIAL APPLICABILITY

According to the present invention, there can be obtained a retarder, set retardative film or sheet or tape, and a decorative pack having both high adhesion properties and high set retardancy. Moreover, the use of the above decorative pack makes the surface treatment of a decorative concrete product easier.

Since the concrete retarder of the present invention itself has both adhesion or adhesion properties and set retarding effect, high adhesion properties and high set retarding ability are compatible. Particularly, since the concrete retarder of the present invention has the adhesion properties and set retardancy both at high levels, the formation of joint sections with high precision is made possible by a sheet formed with this concrete retarder. Moreover, since the sheet is tacky or adhesive, a variety of decorative materials can be adhered thereto without difficulty, and therefore it is easy to fabricate a decorative pack. Further, the process of removing concrete remaining on the surfaces of decorative materials can be made markedly efficient and simple by using a tile pack made with the above sheet for decorating concrete products.

EXAMPLES

The following examples are intended to describe this invention in further detail and should by no means be interpreted as defining the scope of the invention.

Example 1

An unsaturated polyester (number average molecular weight on polystyrene basis: 800) obtained by condensation-polymerizing maleic anhydride and propylene glycol was mixed with hydroxyethyl methacrylate, vinyl acetate, and 2-ethylhexyl acrylate at a ratio by weight of 10: 6: 3: 3. 0.483 g of a peroxide (manufactured by NOF Corporation, "Perbutyl O") and 0.0479 g of cobalt naphthenate were further added to 22 g of the above mixture, and the resultant mixture was applied onto a surface-treated polyethylene terephthalate film (thickness: 38 μm) (thickness of the applied layer: about 80 μm) and the coated film was heated at 120° C. for 10 minutes in an electric furnace for crosslinking (graft polymerization) and curing. The low Tg component having a Tg of −5° C. or lower in this case is 2-ethylhexyl acrylate and accounts for 13.6% by weight relative to the whole retarder, and the surface tension of the coat-applied surface of the film so obtained was 42.1 mN/m.

Example 2

An unsaturated polyester (number average molecular weight on polystyrene basis: 1,500) obtained by condensation-polymerizing maleic anhydride, succinic anhydride (molar ratio: 1:1), and propylene glycol was mixed with hydroxyethyl methacrylate and 2-ethylhexyl acrylate at a ratio by weight of 7:3:7. To 17 g of the mixture were further,added 0.370 g of a peroxide (manufactured by NOF Corporation, "Perbutyl O") and 0.0354 g of cobalt naphthenate, and the resultant mixture was applied to a surface-treated polyethylene terephthalate film (thickness: 38 μm) (thickness of the applied layer: about 80 μm). Then, the film was heated in an electric furnace at 120° C. for 10 minutes for crosslinking (graft polymerization) and curing. The low Tg component having a Tg of not higher than −5° C. is 2-ethylhexyl acrylate and accounts for 41.2% by weight relative to the whole retarder. The surface tension of the coat-applied surface of the film so obtained was 32.1 mN/m.

Example 3

An unsaturated polyester (number average molecular weight on polystyrene basis: 2, 500) obtained by condensation-polymerizing maleic anhydride and polyethylene glycol (molecular weight: 200) was mixed with hydroxyethyl methacrylate and 2-ethylhexyl acrylate at a ratio by weight of 7:3:7. To 17 g of this mixture was further added 0.347 g of a photopolymerization initiator (manufactured by Chiba-Geigy, "Irgacure 651"), and the resultant mixture was applied to a surface-treated polyethylene terephthalate film (thickness: 38 μm) (thickness of the applied layer: about 80 μm), and the layer was irradiated with ultraviolet ray for crosslinking (graft polymerization) and curing. The low Tg components having Tgs of −5° C. or lower in this case are 2-ethylhexyl acrylate and polyethylene glycol and account for 53.5% by weight relative to the whole retarder. The surface tension of the coat-applied surface of the film so obtained was 29.3 mN/m.

Example 4

Methyl methacrylate, methyl acrylate, ethyl acrylate, 2-ethylhexyl acrylate, and acrylic acid were copolymerized at a ratio by weight of 10:10:20:30:30 using azobisisobutyronitrile. When polymerizing, ethyl acetate was used as a solvent. The amount of the solvent used was 100 parts by weight relative to 100 parts by weight of the above monomer mixture. The number average molecular weight on polystyrene basis of the obtained polymer was 30,000. The solution of the polymer was applied to a surface-treated polyethylene terephthalate film (thickness: 38 mm) (thickness of the applied layer after dried: about 80 μm). Then, the film was dried in an electric furnace at 120° C. for 10 minutes. The low Tg components having Tgs of −5° C. or lower are 2-ethylhexyl acrylate and ethyl acrylate and account for 60% by weight relative to the whole retarder. The surface tension of the coat-applied surface of the film so obtained was 30.3 mN/m.

Comparative Example 1

An unsaturated polyester (number average molecular weight on polystyrene basis: 800) obtained by condensation-polymerizing maleic anhydride and propylene glycol was mixed with hydroxyethyl methacrylate, vinyl acetate, and 2-ethylhexyl acrylate at a ratio by weight of 10:6:6:1. To 23 g of this mixture were further added 0.477 g of a peroxide (manufactured by NOF Corporation, "Perbutyl O") and 0.0501 g of cobalt naphthenate, and the resultant mixture was applied to a surface-treated polyethylene terephthalate film (thickness: 38 μm) (thickness of the applied layer: about 80 μm), and the film was heated in an electric furnace at 120° C. for 10 minutes for crosslinking (graft polymerization) and curing. The low Tg component having a Tg of not higher than −5° C. in this case is 2-ethylhexyl acrylate and accounts for 4.3% by weight relative to the whole retarder. The surface tension of the coat-applied surface of the film so obtained was 50.3 mN/m.

Comparative Example 2

Methyl methacrylate, methyl acrylate, ethyl acrylate, and acylylic acid at a ratio by weight of 30:17:28:25 were copolymerized using azobisisobutyronitrile. When polymerizing, ethyl acetate was used as a solvent. The amount of the solvent used was 100 parts by weight relative to 100 parts by weight of the monomer mixture. The number average molecular weight on polystyrene basis of the obtained polymer was 30, 000. The polymer solution was applied to a surface-treated polyethylene terephthalate film (thickness: 38 μm) (thickness of the applied layer after dried: about 80 μm), and the film was dried in an electric furnace at 120° C. for 10 minutes. The low Tg component having a Tg of not higher than −5° C. in this case is ethyl acrylate and accounts for 28% by weight relative to the whole retarder. The surface tension of the coat-applied surface of the film so obtained was 48 mN/m.

Comparative Example 3

25 parts by weight of a retarder (manufactured by Sanso Kagaku, Co. Ltd. Joynone II-type) was blended with 100 parts by weight of an acryl emulsion adhesive (Sekisui Chemical Co., Ltd., Esdine #7110), and the mixture was applied to a surface-treated polyethylene terephthalate film (thickness: 38 μm) (thickness of the applied layer after dried: about 80 μm). Then, the film was dried in an electric furnace at 120° C. for 10 minutes.

In Examples 1 to 4 and Comparative Examples 1 to 3, the molecular weight was determined by gel permeation chromatography at room temperature using tetrahydrofuran as eluent and the calibration curve of polystyrene correlation sample. Moreover, the surface tension was determined by measuring, with n=5, the contact angle of each coat-applied film surface to pure water ($H_2O$) and methylene iodide ($CH_2I_2$) using a Face automatic contact angle measuring device CA-Z type manufactured by Kyowa Kaimen Kagaku Co., Ltd., and calculating from the average of the obtained values using the formula of Forkes.

The concrete set retardative sheets obtained in Examples 1 to 4 and Comparative Examples 1 to 3 were evaluated through the following tests.

(1) Adhesion (1)-1: Under a load of about 30 kg, a tile of porcelain (the area of the adherend: 60 mm×107 mm, about 130 g) was pressed against a piece (15 cm×15 cm) of each retardative film obtained in the process described above for 10 seconds. Then, the film piece held at the edge by hand was quickly shook up and down five times, and evaluated according to the following standards.

A: the tile was not separated even after being shook five times

B: separated on the fourth shake

C: separated on the third shake

D: separated on the second shake

E: separated on the first shake

F: separated when picked up (2) Retardancy (2)-1: Each retardative film piece (10 cm×7 cm) obtained by the above process was adhered to the bottom surface (15 cm×20 cm) of a form of polyethylene (tray, depth: 3 cm) using a double-adhesive tape with its coat-applied surface facing upward. Then, uncured or unset concrete [mortar (Portland cement): standard sand (JIS R5201): ion exchange water=2.0 kg: 4.0 kg: 800 g=100:200:40 (weight ratio)] kneaded for 3 minutes using an 10L omni-mixer (Chiyoda Technical Industrial Co. Ltd., OM-10E)] was poured into the form until the depth of the concrete reached 20±1 mm and given predetermined vibrations utilizing a vibrator. Thereafter, the tray was wrapped to prevent the contents from drying, allowed to stand in an air-conditioned room at a temperature of 23° C. and a humidity of 50% for 24 hours and cured, and the form and the retardative sheet were removed. The surface of the mortar being in contact with the set retardative sheet was washed with water [manually washed for 10 minutes under running water naturally falling down from a height of 50 cm with a tooth brush (product of Kao Corporation, Clear-clean dental brush, hard) properly gripped]. After drying the washed-out surface, the depth of retardation was measured. In other words, taking the height of the surface where the mortar was not in contact with the set retardative sheet as the standard (the periphery of the mortar, areas not washed), the depth from the surface to the washed-out surface was measured using a laser displacement meter (manufactured by Keyence Corporation, LB-080). The measurements were conducted for ten points uniformly distributed on the washed-out surface. The depth of the washed-out surface (the depth of retardation) was figured out by subtracting the thickness of the set retardative sheet from the average of the depths at the ten points. The depth of retardation was evaluated according to the following criteria.

In the measurement of retardancy (the depth of retardation), the temperatures of the materials used were controlled to be 20±1° C. The operations were all conducted at a temperature of 20±1° C. except the period of time during which the mortar was being set or cured.

A: a depth of 3 mm or deeper

B: a depth of 2 to 3 mm

C: a depth of 1 to 2 mm

D: a depth of 0 to 1 mm (2)-2: Two porcelain tiles (the area of the adherend: 60 mm×107 mm, about 130 g) were arranged on each set retardative film piece (15 cm×15 cm) obtained by the above process such that the distance of a gap between the tiles was 7 mm. Then, the tiles were pressed against the film piece under a load of about 30 kg for 10 seconds. Thereafter, with the tile side facing up, the film piece was bonded to the bottom surface of a form using a double-adhesive tape. Unset concrete, i.e., mortar (Portland cement: sand: water= 100:200:40 (weight ratio)) was poured into the form, and the concrete in the form was given predetermined vibrations, allowed to stand in an air-conditioned room at a temperature of 23° C. and a humidity of 50% for 24 hours, and then separated from the form. The tile surfaces from which the film had been removed were washed with water, and the condition of the tile surfaces was visually inspected and evaluated according to the following criteria.

A: no mortar (concrete) remaining (sticking) on the tile surface. Uniformly formed (concaved) joint sections, a depth of 2 mm or depper B: a slight mortar (concrete) remaining (sticking) on the tile surface. The depth of the joint sections (degree of concavity) is shallow, not deeper than 2 mm.

C: some mortar (concrete) remaining (sticking) on the tile surface, cannot be scraped off (scoured away) even with a spatula or brush. Also, the mortar filling up the joint sections was hardly scraped away.

The results are shown in Table 1.

TABLE 1

|  | Adhesion (1)-1 | Retardancy (2)-1 | Retardancy (2)-2 |
|---|---|---|---|
| Example 1 | B | A | A |
| Example 2 | A | A | A |
| Example 3 | A | A | A |
| Example 4 | B | A | B |
| Comparative Example 1 | F | A | B |
| Comparative Example 2 | F | A | B |
| Comparative Example 3 | A | D | C |

Examples 5 to 13 and Comparative Examples 4 to 10

In Examples 5 to 13 and Comparative Examples 4 to 10, the following unsaturated polyesters and vinyl compounds were used.

Unsaturated Polyester A

An unsaturated polyester was prepared from a dicarboxylic acid component and a diol component in proportions (molar ratio) shown in Table 2.

TABLE 2

| | Dicarboxylic acid component | | Diol component | Number | |
|---|---|---|---|---|---|
| | Maleic anhydride (MAH) | Succinic anhydride (SAH) | Propylene glycol (PG) | average Molecular weight Mn | The number of double bonds |
| A-1 | 100 | 0 | 100 | 500 | 2.9 |
| A-2 | 100 | 0 | 100 | 800 | 4.6 |
| A-3 | 100 | 0 | 100 | 1,000 | 5.7 |
| A-4 | 100 | 0 | 100 | 1,300 | 7.5 |
| A-5 | 100 | 0 | 100 | 1,500 | 8.4 |
| A-6 | 100 | 0 | 100 | 2,000 | 11.5 |
| A-7 | 100 | 0 | 100 | 2,500 | 14.4 |
| A-8 | 60 | 40 | 100 | 800 | 2.7 |
| A-9 | 60 | 40 | 100 | 1,500 | 5.1 |
| A-10 | 35 | 65 | 100 | 2,000 | 4.0 |
| A-11 | 25 | 75 | 100 | 2,000 | 2.8 |

In Table 2, the number average molecular weights Mn were determined by gel permeation chromatography (on polystyrene basis).

Vinyl Compound (Low Tg Vinyl Monomer B)
B-1: n-butyl acyrylate (n-BA)
B-2: 2-ethylhexyl acrylate (2-EHA)
(Another Vinyl Monomer C)
C-1: hydroxyethyl methacrylate (HEMA)

Tackifier D

D-1: ethyl acetate (EtAc)
D-2: low molecular weight saturated polyester (PE) (a polyester formed from succinic anhydride and propylene glycol, having a number average molecular weight on polystyrene basis of 500)

Production of Concrete Retardative Sheet

An unsaturated polyester A, a low Tg vinyl monomer B, and the other vinyl monomer C, and a tackifier D were mixed in proportions shown in Table 3 or 4. To the mixture were further added a peroxide (NOF Coroporation, "Perbutyl 0") and cobalt naphthenate. The resultant mixture was applied to a surface-treated polyethylene terephthalate film (thickness: 38 μm) (thickness of the applied layer: 80 μm), and the film was heated in an electric furnace at 120° C. for 10 minutes for crosslinking (graft polymerization) and curing.

The obtained concrete retardative sheet was evaluated through the following tests.

(1) Adhesion (1)-2: Two porcelain tiles (the area of the adherend: 45 mm×45, mm, about 29 g) were pressed against each set retardative film piece (10 cm×10 cm) obtained by the above process for 10 seconds under a load of about 30 kg. Then, the film piece held at the upper long side area by hand was quickly shook up and down ten times, and evaluated according to the following criteria.

A: tiles were not separated even when shook ten times
B: tiles were separated by being shook one to nine times
C: separated when picked up
D: tiles were not adhered to the film piece at all (2) Retardancy (2)-3: Each set retardative film piece (10 cm×7 cm) so obtained was adhered to the bottom surface of a form using a double-adhesive tape with the retarder-applied surface of the film facing up. Unset or uncured concrete was poured into the form and given predetermined vibrations. Thereafter, the concrete was allowed to stand in an air-conditioned room at a temperature of 23° C. and a humidity of 50% for 24 hours for curing or setting, and then detached from the form. The concrete was washed with water, the depth of retardation was measured, and the retardancy was judged by the depth measured according to the following criteria.

A: a depth of 2 mm or more
B: a depth of 1 to 2 mm
C: a depth of 0.1 to 1 mm
D: a depth of 0 to 0.1 mm
The results are shown in Tables 3 to 5.

TABLE 3

| | | | Ex. 5 | Ex. 6 | Ex. 7 | Ex. 8 | Ex. 9 | Ex. 10 |
|---|---|---|---|---|---|---|---|---|
| Unsaturated Polyester A | species | | A-1 | A-2 | A-3 | A-4 | A-9 | A-10 |
| | Proportion (molar ratio) | MAH | 100 | 100 | 100 | 100 | 60 | 35 |
| | | SAH | 0 | 0 | 0 | 0 | 40 | 65 |
| | | PG | 100 | 100 | 100 | 100 | 100 | 100 |
| | Molecular weight Mn | | 500 | 800 | 1,000 | 1,300 | 1,500 | 2,000 |
| | The number of double bonds | | 2.9 | 4.6 | 5.7 | 7.5 | 5.1 | 4.0 |
| | Unsaturated polyeser A | | 100 | 100 | 100 | 100 | 100 | 100 |

TABLE 3-continued

|  |  |  | Ex. 5 | Ex. 6 | Ex. 7 | Ex. 8 | Ex. 9 | Ex. 10 |
|---|---|---|---|---|---|---|---|---|
| Concrete retarder Proportion (weight ratio) | Low Tg vinyl monomer B | n-BA | 70 | 70 | 70 | 70 | 70 | 70 |
|  |  | 2-EHA | — | — | — | — | — | — |
|  | Another vinyl monomer C | HEMA | 30 | 30 | 30 | 30 | 30 | 30 |
|  | Tackifier D | EtAc | — | — | — | — | — | — |
|  |  | PE | — | — | — | — | — | — |
|  | Adhesion |  | A | B | B | C | A | A |
|  | Retardancy |  | A | A | A | A | A | B |

TABLE 4

|  | Species |  | Comp. Ex. 4 A-5 | Comp. Ex. 5 A-6 | Comp. Ex. 6 A-7 | Comp. Ex. 7 A-11 |
|---|---|---|---|---|---|---|
| Unsaturated polyester A | Proportion (molar ratio) | MAH | 100 | 100 | 100 | 25 |
|  |  | SAH | 0 | 0 | 0 | 75 |
|  |  | PG | 100 | 100 | 100 | 100 |
|  | Molecular weight Mn |  | 1,500 | 2,000 | 2,500 | 2,000 |
|  | The number of double bonds |  | 8.4 | 11.5 | 14.4 | 2.8 |
| Concrete retarder Proportion (weight ratio) | Unsaturated polyester A |  | 100 | 100 | 100 | 100 |
|  | Low Tg vinyl monomer B | n-BA | 70 | 70 | 70 | 70 |
|  |  | 2-EHA | — | — | — | — |
|  | Another vinyl monomer C | HEMA | 30 | 30 | 30 | 30 |
|  | Tackifier D | EtAc | — | — | — | — |
|  |  | PE | — | — | — | — |
|  | Adhesion |  | D | D | D | A |
|  | Retardancy |  | A | B | B | C |

TABLE 5

|  |  |  | Ex. 11 | Ex. 12 | Ex. 13 | Comp. Ex. 8 | Comp. Ex. 9 | Comp. Ex. 10 |
|---|---|---|---|---|---|---|---|---|
|  | Species |  | A-4 | A-4 | A-4 | A-5 | A-5 | A-8 |
| Unsaturated polyester A | Proportion (molar ratio) | MAH | 100 | 100 | 100 | 100 | 100 | 60 |
|  |  | SAH | 0 | 0 | 0 | 0 | 0 | 40 |
|  |  | PG | 100 | 100 | 100 | 100 | 100 | 100 |
|  | Molecular weight Mn |  | 1,300 | 1,300 | 1,300 | 1,500 | 1,500 | 800 |
|  | The number of double bonds |  | 7.5 | 7.5 | 7.5 | 8.4 | 8.4 | 2.7 |
| Concrete retarder Proportion (weight ratio) | Unsaturated polyester A |  | 100 | 100 | 100 | 100 | 100 | 100 |
|  | Low Tg vinyl monomer B | n-BA | 70 | — | — | 70 | 70 | — |
|  |  | 2-EHA | — | 70 | 70 | — | — | — |
|  | Another vinyl monomer C | HEMA | 30 | 30 | 30 | 30 | 30 | 30 |
|  | Tackifier D | EtAc | — | — | 50 | 50 | — | — |
|  |  | PE | 20 | — | — | — | 20 | — |
|  | Adhesion |  | A | C | A | D | C | C |
|  | Retardancy |  | A | C (#) | A | A | A | A |

: non-uniformity in the retardancy

As obvious from Tables, the set retardative sheets (set retarders) of Examples are excellent in adhesion and concrete set ratardancy.

Example 14

A tile pack was obtained by adhering a total of 60 tiles (107 mm×60 mm, 130 g) in 6 rows in the longer side direction and 10 rows in the shorter side direction at 7 mm spacing on the unsaturated polyester-series concrete set retardative sheet used in Example 9 (700 mm×700 mm) with their dressed surfaces as adherend. The tile pack was laid on the bottom surface of a foam with internal dimensions of 700 mm×700 mm×100 mm with the tile-applied surface facing up, and mortar composed of 100 parts by weight of Portland cement, 200 parts by weight of sand, and 40 parts by weight of water was poured into the form until the layer thickness reached 50 mm. The mortar was allowed to stand at room temperature for 48 hours for curing or setting. After the set of mortar, the form was detached from the mortar, and the set retardative sheet was removed from the tile surfaces. Then, the tile surfaces were washed with water using a scrubbing brush for washing away the unset or uncured mortar remaining on the tile surfaces and in the joint sections. There was left no mortar on the tile surfaces, and the joint sections between the tiles were almost uniformly concaved for a depth of about 3 mm.

In the above process, the time taken to wash the final tile surfaces and the joint sections by one person was 7 minutes.

Comparative Example 11

In the tile pack fabrication, a concrete panel decorated with 60 tiles was made in the same manner as in Example 14 except that a concrete set retardative sheet to which Esdine #7110 manufactured by Sekisui Chemical Co. Ltd. used in Comparative Example 3 was applied was used instead of the unsaturated polyester-series concrete set retardative sheet of Example 9 and that the gaps between the tiles were filled with a filling material for joints. In the tile pack fabrication, the filling material filling up a joint section between the tiles is a 7.5 mm-width tape cut from a 3 mm-thick polyethylene foam sheet. Tapes for the joint sections in the longer side direction of the tile were those cut to 700 mm long, and tapes for the joint sections in the shorter side direction of the tile were those cut to 60mm long. Stuffing the gaps between the tile with the tapes (while adhering the tapes to the adhesive sheet) were all done manually by a single person. The time spent for this job was 13 minutes.

After the set of the mortar, the adhesive sheet and the filling material occupying the gaps were delaminated or removed. Attempts to wash away the cured mortar remaining on the tile surfaces and side surfaces (between a tile and a foam tape) with a scrubbing brush were made, but resulted in complete failure. An attempt to remove the remaining mortar with a wire brush and a spatula took a single person 30 minutes and longer. Moreover, the tile surfaces obtained in Comparative Example 11 were considerably poor in external appearance compared to the tile surfaces of Example 14.

What is claimed is:

1. A concrete retarder having the ability to retard a set of concrete upon contact with unset concrete comprising, three components (i), (ii) and (iii), wherein component
   (i) is a main component and is an adhesive component comprising a polymer (A), wherein the polymer (A) comprises a hydrophobic component with a low glass transition temperature (Tg) not higher than $-5°$ C. as a structural unit, and a surface tension of not higher than 35 mN/m, and wherein said hydrophobic component comprises at least one member selected from the group consisting of an acrylic acid $C_{6-12}$alkyl ester and a methacrylic acid $C_{6-14}$alkyl ester;
   component (ii) is a concrete set retardative component having or generating a carboxyl group selected from a group consisting of (meth)acrylic acid; polycarboxylic acid or esters and anhydrides thereof; and polyesters; and
   component (iii) comprises a hydrophilic group including hydroxyl groups and (poly)oxyalkylene groups introduced by polymerization.

2. A concrete retarder according to claim 1, wherein the content of the low Tg component having a glass transition temperature (Tg) of not higher than $-5°$ C. is not less than 20% by weight relative to the whole polymer (A).

3. A concrete retarder according to claim 1, wherein the polymer (A) has a functional group capable of forming a salt with a metal ion.

4. A concrete retarder according to claim 3, wherein the functional group is a free acid group or a group capable of forming an acid group by hydrolysis.

5. A concrete retarder according to claim 4, wherein the acid groups are present in positions so that the acid groups can form a chelate structure with a metal ion.

6. A concrete retarder according to claim 4 or 5, wherein the acid group is carboxyl group.

7. A concrete retarder according to claim 1, wherein the polymer (A) has a hydrophilic group other than acid groups.

8. A concrete retarder according to claim 7, wherein the hydrophilic group is hydroxyl group.

9. A concrete retarder according to claim 1, wherein the polymer (A) has the low glass transition temperature (Tg) n component having a Tg of not higher than $-5°$ C., and wherein the low Tg component is either in the main chain or in the side chain.

10. A concrete retarder according to claim 1, wherein the polymer (A) is a copolymer with at least one member selected from the group consisting of (meth)acrylic acid, maleic acid, an ester thereof, and an acid anhydride thereof.

11. A concrete retarder according to claim 1, wherein the polymer (A) is a vinyl-series polymer.

12. A concrete retarder according to claim 1, wherein the polymer (A) is a polyester.

13. A concrete retarder according to claim 1, wherein the polymer (A) is a crosslinked or graft polymerized unsaturated polyester.

14. A concrete retarder according to claim 13, wherein the polymer (A) comprises an unsaturated polyester and a vinyl compound.

15. A concrete retarder according to claim 14, wherein the number of unsaturated bonds of the unsaturated polyester per molecule is not more than eight on average.

16. A concrete retarder according to claim 14, wherein the proportion of an unsaturated dicarboxylic acid component of a dicarboxylic acid component constituting the unsaturated polyester is not less than 30 mol %.

17. A concrete retarder according to claim 14, wherein the vinyl compound comprises a low glass transition temperature (Tg) vinyl monomer corresponding to a homopolymer having a Tg of not higher than $-5°$ C.

18. A concrete retarder according to claim 17, wherein the content of the low Tg vinyl monomer is not less than 10% by weight relative to the whole polymer (A).

19. A concrete retarder according to claim 17, wherein the low Tg vinyl monomer is at least one member selected from the group consisting of an acrylic acid $C_{4-12}$alkyl ester, and a methacrylic acid $C_{6-14}$alkyl ester.

20. A concrete retarder according to claim 17, wherein the vinyl compound further contains at least one vinyl monomer selected from the group consisting-of (meth)acrylic acid, methyl acrylate, a methacrylic acid $C_{1-5}$alkyl ester, a hydroxyalkyl methacrylate, maleic anhydride, maleic acid, a maleic acid ester, fumaric acid and an ester thereof, a vinyl ester, a vinyl ether, an allyl ester, an ally ether, and an aromatic vinyl compound.

21. A concrete retarder according to claim 14, which comprises, as a main component, a crosslinked or graft polymerized unsaturated polyester constituted of maleic acid or maleic anhydride as a dicarboxylic acid component and a vinyl compound corresponding to a homopolymer having a glass transition temperature (Tg) of not higher than $-5°$ C., wherein the number of double bonds of the unsaturated polyester per molecule is 0.5 to 7 on average.

22. A concrete retarder according to claim 21, which further comprises a saturated compound compatible with the unsaturated polyester.

23. A concrete retarder according to claim 22, wherein the saturated compound is at least one member selected from the group consisting of an ester, an aromatic hydrocarbon, and a ketone.

24. A concrete retarder according to claim 1, wherein the polymer (A) has hydrophobic and a low glass transition temperature (Tg) component having a Tg of not higher than $-5°$ C. as a structural unit, a functional group capable of forming a salt with a metal ion, and a hydrophilic group other than acid groups, and wherein the low glass transition temperature (Tg) component comprises at least one member selected from the group consisting of an acrylic acid $C_4$–14 alkyl ester.

* * * * *